US008619360B2

(12) United States Patent  (10) Patent No.: US 8,619,360 B2
Mao  (45) Date of Patent: Dec. 31, 2013

(54) TECHNIQUE FOR TELESCOPE BALANCE

(75) Inventor: Yubing Mao, Jiangsu (CN)

(73) Assignee: Nanjing iOptron Scientific Inc. Ltd., Nanjing, Jingsu (CN)

( * ) Notice: Subject to any disclaimer, the term of this patent is extended or adjusted under 35 U.S.C. 154(b) by 91 days.

(21) Appl. No.: 13/432,783

(22) Filed: Mar. 28, 2012

(65) Prior Publication Data

US 2013/0258459 A1  Oct. 3, 2013

(51) Int. Cl.
*G02B 23/00* (2006.01)

(52) U.S. Cl.
USPC ........................................... 359/399

(58) Field of Classification Search
USPC .......................... 359/399, 429, 430
See application file for complete search history.

(56) References Cited

U.S. PATENT DOCUMENTS

| 4,362,354 | A  | * | 12/1982 | Hager | 359/430 |
| 6,940,642 | B2 | * | 9/2005 | Shen | 359/430 |
| 2006/0092508 | A1 | * | 5/2006 | Baun et al. | 359/429 |

OTHER PUBLICATIONS

"20" MAX_ACF Advanced Coma-Free Telescope on MAX Robotic German Equatorial Mount," Instruction Manual, Meade Instruments Corp., 2010, 6 pages.
Kerr, "Automated Telescopt Balance Weights," downloaded from http://www.cfht.hawaii.edu/Reference/Bulletin/Bull16/9.pdf, accessed in Bulletin 16, dated 1987, from http://www.cfht.hawaii.edu/Reference/Bulletin/.

* cited by examiner

*Primary Examiner* — Frank Font
(74) *Attorney, Agent, or Firm* — BainwoodHuang

(57) ABSTRACT

An improved technique balances a telescope from the viewpoint of the motors that drive the telescope's axes. A motor that controls movement along an axis of the telescope drives the telescope in one direction and then in the opposite direction. Motor current is measured while the motor is driving the telescope in each direction, and a difference in motor current is computed. The difference in motor current indicates the degree of imbalance of the telescope, which may be communicated to an operator to allow adjustments to the telescope to improve its balance.

20 Claims, 7 Drawing Sheets

TECHNIQUE FOR TELESCOPE BALANCE

CROSS-REFERENCES TO RELATED APPLICATIONS

Not Applicable.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO A "SEQUENCE LISTING," A TABLE, OR A COMPUTER PROGRAM LISTING APPENDIX

Not Applicable.

BACKGROUND OF THE INVENTION

1. Field of the Invention

This invention relates generally to astronomical telescopes, and, more particularly, to techniques for balancing astronomical telescopes.

2. Description of Related Art

Astronomical telescopes are essential observing equipment for professional and amateur astronomers alike. Telescopes are available in a wide variety of optical types, including refracting, reflecting, and catadioptric systems, and with a wide variety of mounts, including altazimuth, equatorial, and spherical mounts.

Both altazimuth and equatorial mounts allow telescopes to rotate about two perpendicular axes. In a typical altazimuth mount, the axes allow up-down rotation of the telescope (altitude) and left-right rotation (azimuth). In an equatorially mounted telescope, the two axes are angled based on the observer's latitude, such that one axis allows rotation in declination (celestial "longitude") and the other axis allows rotation in right ascension (celestial "latitude"). Equatorial mounts offer the advantage of single-axis tracking. With the mount aligned to a celestial pole (north or south), the mount can be counter-rotated in right ascension only to compensate for the earth's rotation. Equatorial mounts are generally equipped with clock drive units on their right ascension axes, which automatically provide the requisite counter-rotation to track celestial objects.

FIG. 1 shows an example of telescope that includes an equatorial mount 100 for carrying an optical assembly 150. This type of mount is known as a German equatorial mount. The mount 100 includes a declination (DEC) axis 110 and a right ascension (R.A.) axis 112. Internal shafts and bearings allow rotation of the mount 100 about both the declination and right ascension axes. The optical assembly 150 attaches to a clamp 120. The mount 100 may also include a counterweight shaft 122 and adjustable counterweight 124, for balancing the weight of the optical assembly 150. The mount includes an adjustment wedge 114. The wedge has a base 116, which is rotatably coupled to a tripod 118. Typically, the mount 100 also includes motor assemblies 126 and 128 for effecting controlled rotation of the mount in declination and right ascension, respectively. The mount 100 may also include a communications interface 130, for communicating with a hand controller or a computer for receiving commands to control the motors 126 and 128. The mount 100 may also include a DEC clutch 134 and an R.A. clutch 136 for locking the mount 100 in DEC and R.A. axes, respectively.

Balance of a telescope has conventionally been achieved by manually adjusting the position of the optical assembly 150 (e.g., forward or back along the clamp 120) and by adjusting the position of the counterweight 124. All desired accessories (e.g., eyepiece, camera, finder scope, etc.) are typically loaded prior to balancing. A rough balancing is first done by eye for safety. Then a more precise balancing is performed. To more precisely balance the telescope, the mount 100 is typically oriented with both axes 110 and 112 parallel to the ground. With this arrangement, the mount 100 may naturally tend to rotate one way or the other about each axis. An operator can then move the optical assembly 150 backwards or forwards along the clamp 120, and move the counterweight 124 in or out along the counterweight shaft 122, until balance about both axes is achieved.

BRIEF SUMMARY OF THE INVENTION

Proper balancing of a telescope helps to promote safety as well as accurate operation and longevity of components. An unbalanced telescope may have jerky motions, be unstable, and tend to drift. Imbalances can sometimes overload motors and motor controllers, and can result in abnormal wear patterns in gears and other mechanical parts.

Unfortunately, the conventional manual balancing technique often yields imperfect results, which can cause slight irregularities in telescope movement and tracking. These irregularities are particularly noticeable when the telescope is used for astrophotography. Even if the conventional approach yields perfect geometrical balancing of a scope, the approach still does not account for imbalances introduced by gears, motors, and other mechanical offsets.

In contrast with the conventional approach, an improved technique balances a telescope from the viewpoint of the motors that drive the telescope's axes. For any axis of a telescope mount, balance is thus achieved when the motor driving the telescope about that axis works equally hard rotating the telescope in one direction as it does rotating the telescope in the opposite direction.

Certain embodiments are directed to a method of balancing a telescope. The method includes directing a motor to drive the telescope in a first rotational direction about an axis of the telescope and measuring a first current drawn by the motor. The method further includes directing the motor to drive the telescope in a second rotational direction opposite the first rotational direction and measuring a second current drawn by the motor. The method still further includes producing an indication of balance of the telescope based on a difference between the first current and the second current.

Additional embodiments are directed to an apparatus for balancing a telescope. The apparatus includes a motor arranged to rotate an optical assembly of the telescope about an axis of the telescope and a control circuit coupled to the motor. The control circuit includes a motor driver arranged to direct the motor to drive the optical assembly in a first rotational direction about the axis of the telescope and to drive the optical assembly in a second direction, opposite the first rotational direction, about the axis of the telescope. The control circuit further includes a current measuring circuit, coupled to the motor driver and arranged to measure a first current drawn by the motor when the motor is driving the optical assembly in the first rotational direction and to measure a second current drawn by the motor when the motor is driving the optical assembly in the second rotational direction. The control circuit still further includes a calculating circuit arranged to calculate a difference between the first current and the second current.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

An improved technique balances a telescope from the viewpoint of the motors that drive the telescope's axes. A motor that controls movement along an axis of the telescope drives the telescope in one direction and then in the opposite direction. Motor current is measured while the motor is driving the telescope in each direction, and a difference in motor current is computed. The difference in motor current indicates the degree of imbalance of the telescope, which may be communicated to an operator to allow adjustments to the telescope to improve its balance.

Figure 1:
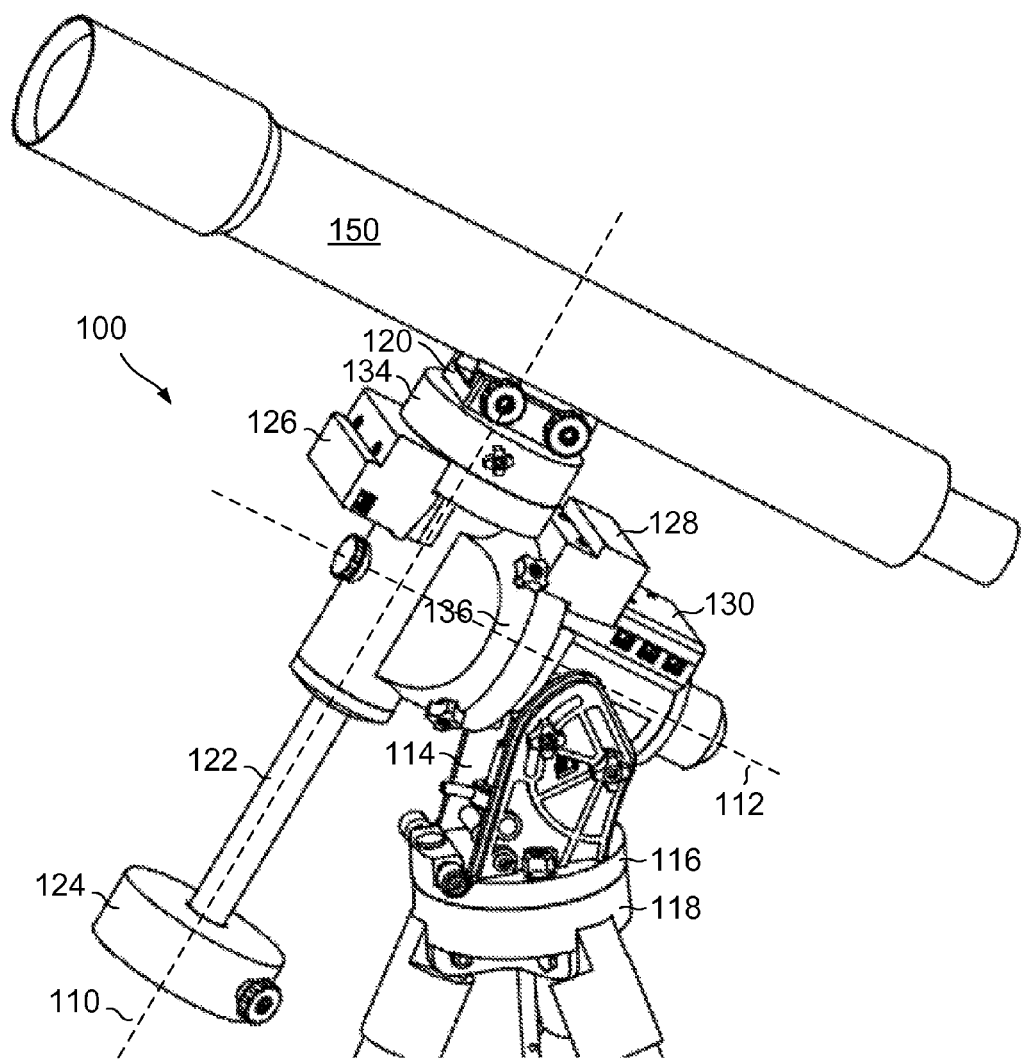
FIG. 1 is a perspective view of a conventional equatorial mount.
Figure 2A:
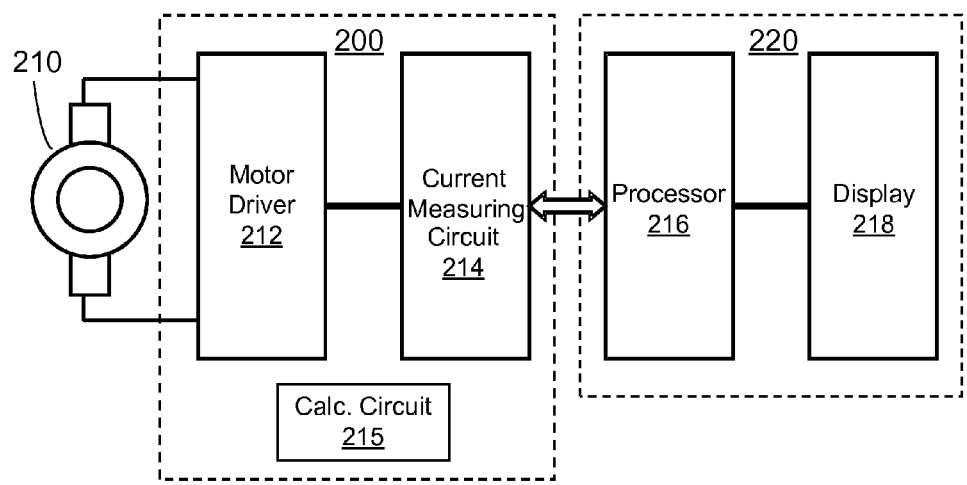
FIG. 2A is a block diagram of an example control system for implementing a process for balancing a telescope from the viewpoint of its motors.

FIG. 2 shows a diagram of a motor controlling system including a motor 210, a control circuit 200, and a hand controller 220. The motor controlling system of FIG. 2A may be employed for both DEC and R.A. axes of an equatorial mount, or for both altitude and azimuth axes of an altazimuth mount. The control circuit 200 includes a motor driver 212, a current sampling circuit 214, and a calculating circuit 215. In an example, the calculating circuit 215 is implemented as a microcontroller or microprocessor, which, in addition to calculating, may perform other functions. The hand controller 220 includes a processor 216, such as a micro computing unit (MCU), and a display 218.

Figure 5:
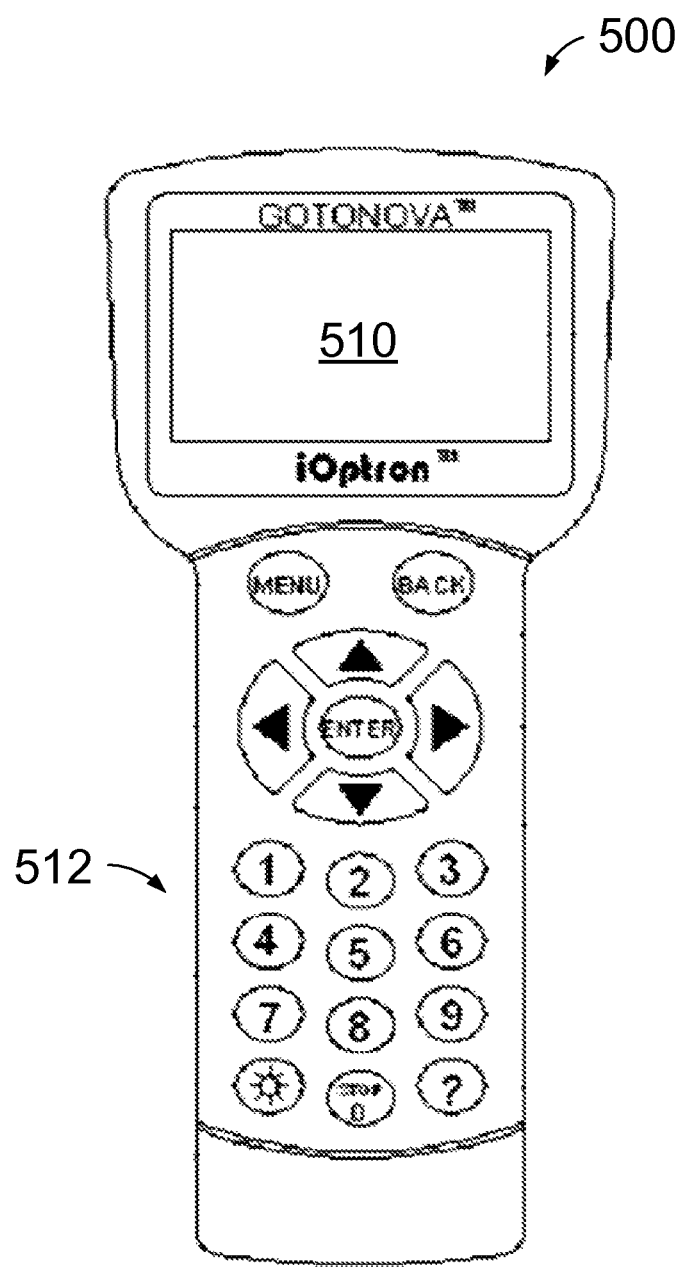
FIG. 5 is a front elevation view of an example hand controller for controlling the equatorial mount of FIG. 1 and adapted for use in implementing the process of FIG. 4.

In one example, the hand controller 220 is the hand controller 500 and the display 218 is the display 510 of the hand controller 500 (see FIG. 5). It is understood, however, that the components of the control circuit 200 and hand controller 220 may be may be provided in a single unit, in greater than two units, and may be arranged differently than as shown. For instance, some implementations may place the current measuring circuit 214 and calculating circuit 215 in the hand controller 220. The arrangement of FIG. 2A is therefore merely illustrative.

The motor 210 may be a DC motor or a stepper motor, for example. In an example, the motor 210 is a DC motor configured in a servo arrangement, where the motor 210 works in coordination with an optical encoder for precise motor position sensing and control. The optical encoder has a resolution of 1024 steps per revolution and is mounted to a shaft of the motor 210. The shaft of the motor 210 is coupled to a worm shaft, which in turn is coupled to a worm gear for driving a respective axis of the telescope mount.

Figure 2B:
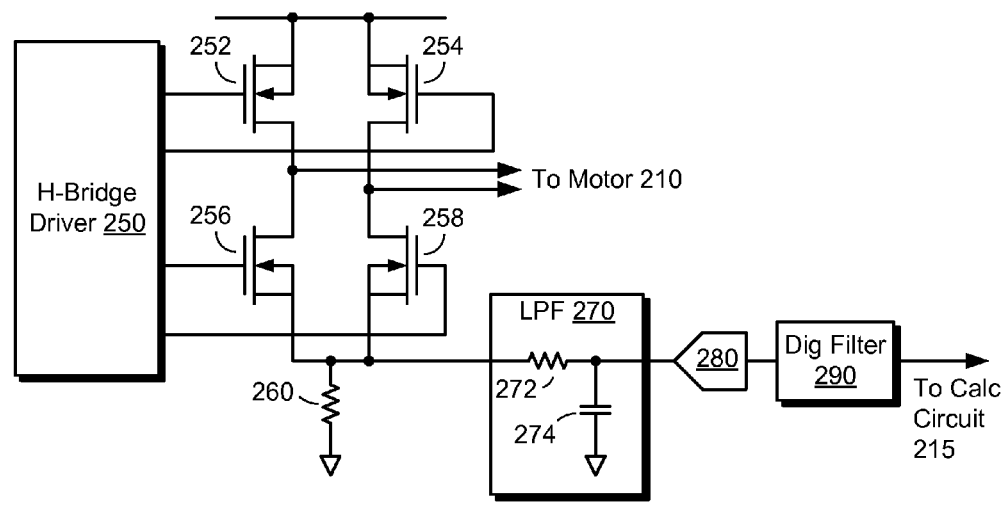
FIG. 2B is a simplified schematic diagram of portions of the control system of FIG. 2A.

FIG. 2B shows portions of the motor driver 212 and current measuring circuit 214. An H-bridge driver 250 and an H-bridge, which includes transistors 252, 254, 256, and 258, may be parts of the motor driver 212, for example. A resistor 260, low pass filter 270 (including a resistor 272 and a capacitor 274, for example), analog-to-digital converter 280, and digital filter 290 may be parts of the current measuring circuit 214, for example. The H-bridge driver 250 supplies pulse-width modulated control signals to control terminals (e.g., mosfet gates) of the transistors 252, 254, 256, and 258. The H-bridge has two output terminals that connect to terminals of the motor 210 in the arrangement shown. The H-bridge drives the motor 210 in an alternating manner by, first, turning on transistors 252 and 258 and turning off transistors 254 and 256, and, second, turning on transistors 254 and 256 and turning off transistors 252 and 258. As a result of the switching of the H-bridge, and in both alternating configurations, current supplied to the motor 210 flows through resistor 260. Consequently, a voltage drop is generated across the resistor 260, i.e., by operation of Ohm's Law. It is understood that the voltage across the resistor 260 varies over time, on account of the switching of the H-bridge and the dynamic load presented by the motor 210. In an example, the resistor 260 is implemented as three 1-ohm resistors connected in parallel. Although the singular term, "the resistor," is used, it is understood this term is intended to include multiple physical resistance elements connected together in any suitable way.

A low pass filter 270 is provided to filter this variable signal, and the filtered result is sampled by the analog-to-digital converter 280. Digital samples from the analog-to-digital converter 280 are then subjected to a digital filter 290, such as a 50% weighted FIR filter, and resulting filtered, current samples are sent to the calculation circuit 215.

Although only one motor 210 is shown, both axes of a telescope may be driven by respective motors to balance the telescope. It is understood, therefore, that a different motor 210 will typically be used for each axis, as well as a different motor driver 212 and current measuring circuit 214.

Figure 3A:
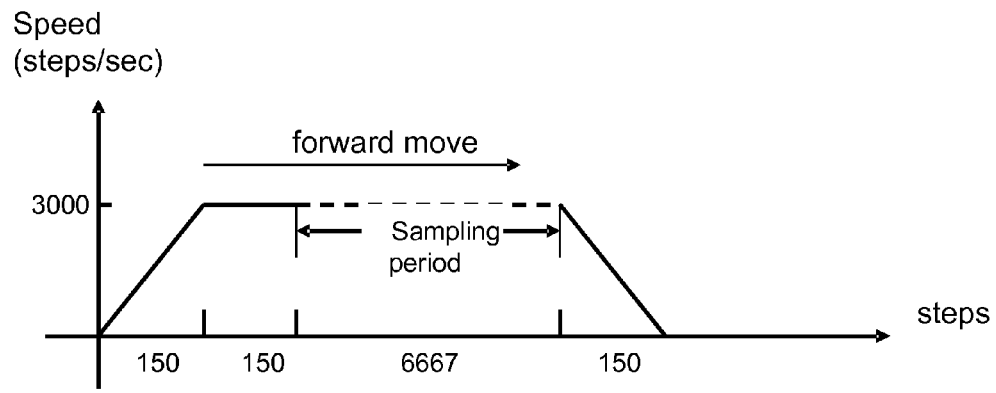
FIGS. 3A and 3B are diagrams showing example sequences of motor movement and motor current measurements.

FIG. 3A shows a motor driving and current sampling process during a forward movement of the motor 210. In an example, the motor driver 212 accelerates the motor 210 (e.g., through operation of the H-bridge driver 250 and transistors 252, 254, 256, and 258) from zero to 3000 steps/second over an interval of 150 steps, where each "step" refers to an optical encoder step. After waiting another 150 steps to stabilize the rotation of the motor 210, the current measuring circuit 214 commences sampling of the forward move current at a sampling rate of 180 Hz. For example, the analog-to-digital converter 280 acquires a total of 400 samples. The motor 210 moves 6667 steps during the forward current sampling period. Then the motor 210 takes another 150 steps to reduce its speed to zero.

Figure 3B:
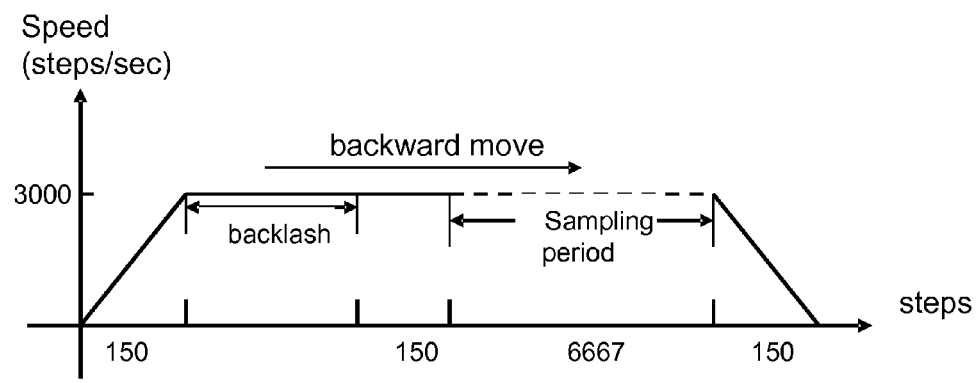

FIG. 3B shows a motor driving and current sampling process during a backward movement of the motor 210. Here, the motor 210 is accelerated from zero to 3000 steps/second over the course of 150 steps. Extra steps (e.g., 150 extra steps) can be added to account for any backlash. After the motor stabilizes, the current measuring circuit 214 commences sampling of the backward move current at a sampling rate of 180 Hz. A total of 400 samples are collected. The motor moves 6667 steps during the current backward sampling period. Then the motor takes another 150 steps to reduce its speed to zero.

Figure 4:
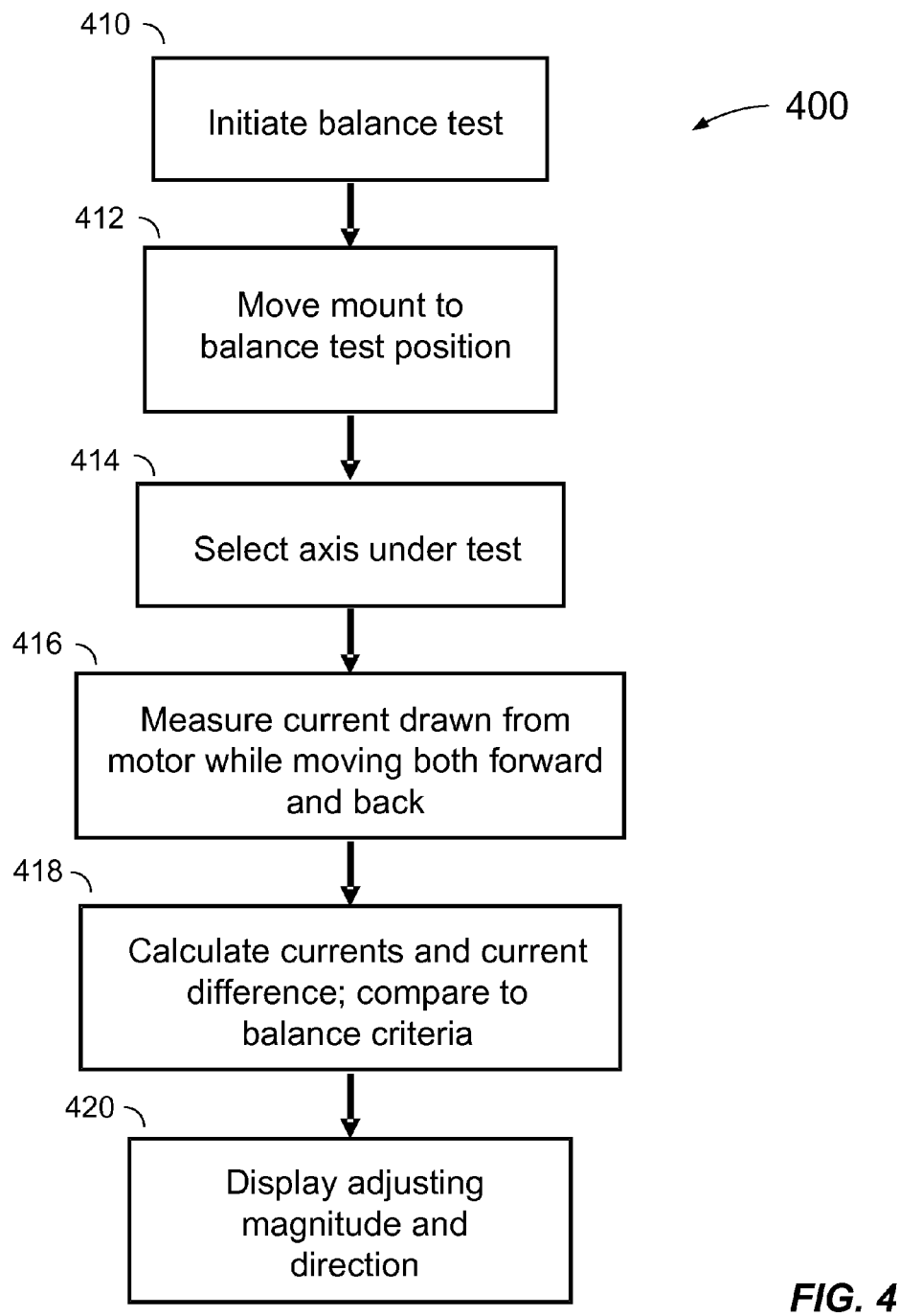
FIG. 4 is a flowchart showing an example process for balancing a telescope.

FIG. 4 shows a process 400 for producing accurate balance test information. In an example, the process 400 is performed in connection with software or firmware instructions running on the processor 216, to control the motor controller 200. The instructions may be stored, read into memory, and executed by the processor 216. Output from the processor 216 may be provided to the display 218.

To test the balance along a R.A. axis or DEC axis of an equatorial mount 100, a balance test command may be received by the controller 500 from an operator at step 410.

Figure 6A:
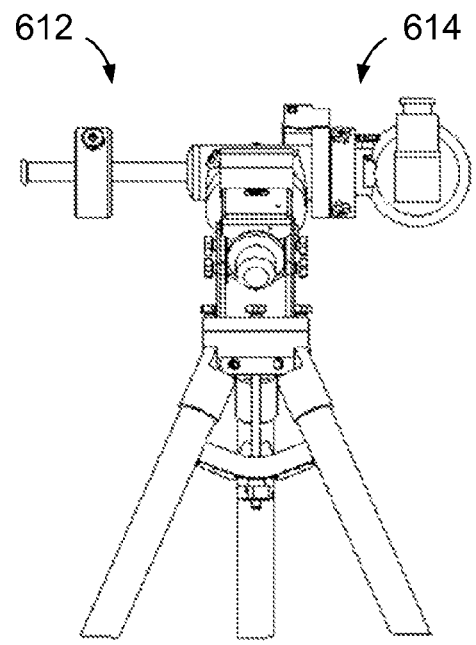
FIGS. 6A and 6B are, respectively, front and side views of a balance test position of a telescope.
Figure 6B:
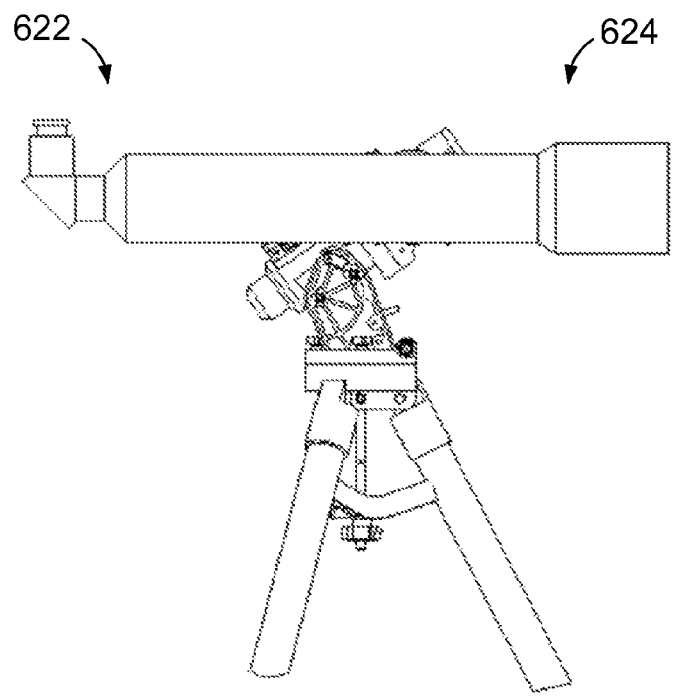

At step 412, the controller 500 may send a slew command to DEC and R.A. assemblies 126 and 128, respectively, to move the optical assembly 150 to a balance test position. The balance test position may be the one in which both R.A. and DEC axes are parallel to the ground surface, as indicated in FIGS. 6A and 6B. The controller 500 may calculate how many degrees the DEC axis needs to be rotated based on the latitude of the location where the telescope is being used.

At step 414, a R.A. balance test or a DEC balance test may be selected via controller 500.

At step 416, the control circuit 200 may send instructions to the motor to move the motor 210 forward first and then backward, sample the motor currents, and send the sample data to controller 500.

At step 418, the collected data will be processed. The processor 216 may calculate the average motor current using these 400 samples. The difference between the average forward move current $I_F$ and the average backward move current $I_B$, $I_{ERR}$, then may be calculated.

At step 420, a balance test result may be displayed on display 510 of the controller 500.

As an example, if the current difference $I_{EFF}=I_F-I_B$ of the R.A. balance test is less then 3 milliamp (mA), i.e., −3 mA<$I_{ERR}$<3 mA, one may consider the mount 100 to be balanced along R.A. axis. In this case the display 510 may show OK. If the current difference $I_{EFF}$ is greater than 3 mA, one may consider the mount 100 to be off-balance along the R.A. axis.

Figure 7A:
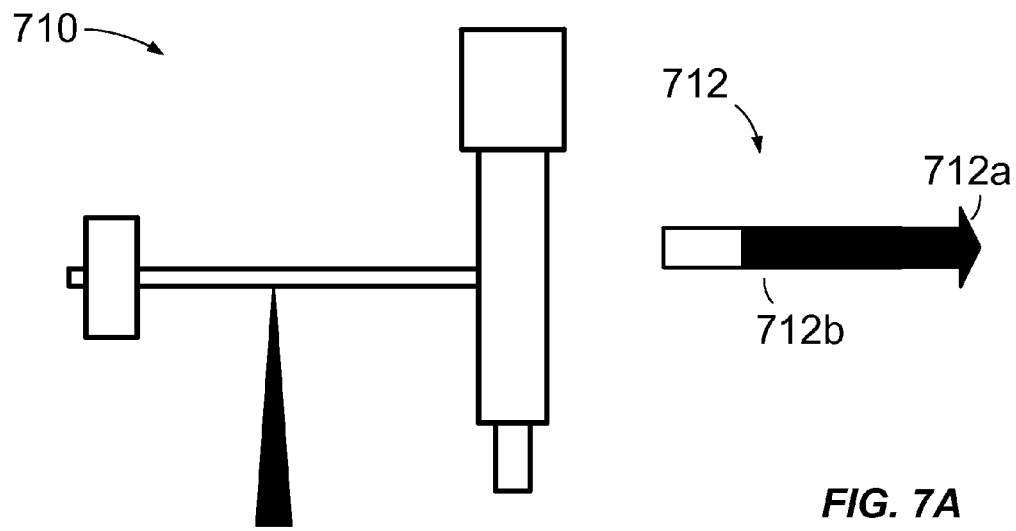
FIG. 7A is an example visual display of R.A. balance test results, as displayed by the controller of FIG. 5.

FIG. 7A shows an example of a visual representation 710, as displayed on the display 510 of the controller 500, during a R.A. balance test. An arrow 712 is seen to have an arrowhead 712a and an elongated portion 712b. The arrow 712 may represent two things. First is the direction, as indicated by the arrowhead 712a, in which to move the counterweight (e.g., the counterweight 124 of the mount 100). Second, the shaded region of the elongated portion 712b indicates how far approximately the counterweight needs to be moved. The elongated region 712b may further be divided into a number of sections (e.g., 8 sections), with one shaded section indicating the closest to well balanced and 8 shaded sections indicating that the R.A. is highly off-balanced. In the example shown in FIG. 7A, the R.A. axis is not well balanced. The counterweight side 612, as shown in FIG. 6A, is heavier (i.e., requires a higher motor current to lift) than the optical assembly side 614. The counterweight needs to be moved closer to the mount, or rightward in this case. The more segments that are shaded, the greater the distance the counterweight needs be moved.

After adjusting the counterweight position, one may keep performing the balance test on the same axis and adjusting the counterweight position until a Balance OK indication is displayed on controller display 510.

Figure 7B:
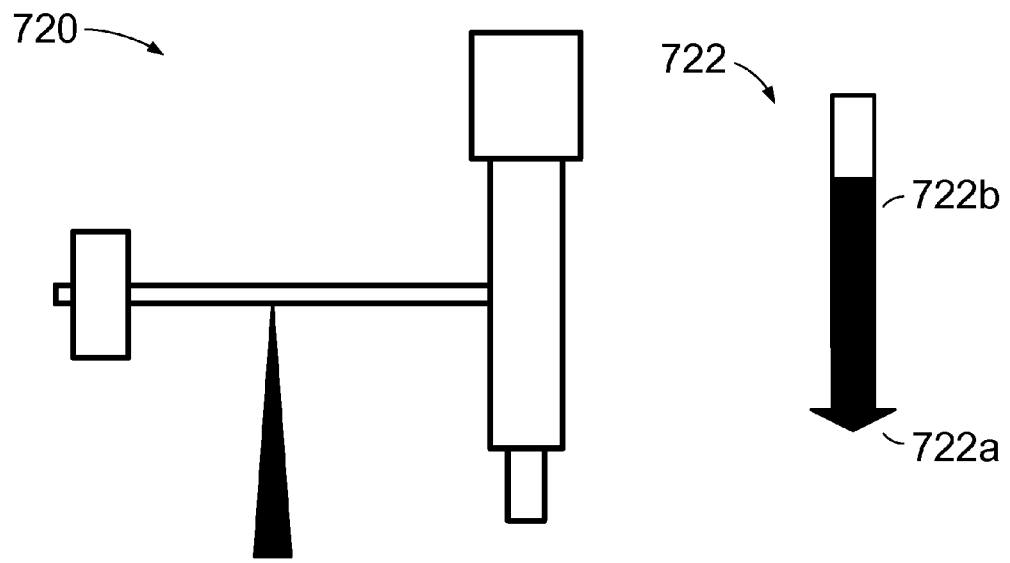
FIG. 7B is an example visual display of DEC balance test results, as displayed by the controller of FIG. 5.

FIG. 7B shows an example of a visual representation 720, as displayed on the display 510 of the controller 500, during of a DEC balance test. An arrow 722 is seen to have an arrowhead 722a and an elongated portion 722b. The arrow 722 may represent two things. First, the direction of the arrowhead 722a indicates the direction to move the optical assembly (e.g., along the clamp 120). Second is how far approximately the optical assembly needs to be moved. The elongated portion 722 may be further divided into sections (e.g., 8 sections), with one shaded section indicating the closest to well balanced and 8 shaded sections indicating that the DEC axis is highly off-balanced. For the example shown in FIG. 7B, the DEC axis is not well balanced. The front end 622 of the optical assembly, as shown in FIG. 6B, has is heavier (requires a higher motor current to lift) than the back end 624. The optical assembly 150 needs be moved backward in this case. The more segments that are shaded, the farther telescope needs be moved.

After adjusting the telescope position, one may keep performing balance test on the same axis again and keep adjusting the telescope position until Balance OK is displayed on controller display 510.

Although steps of the process 400 are shown and described in a particular sequence, the sequence is merely exemplary. Except where clear dependencies are present, the sequence of steps may be varied from that shown, and/or certain steps may be performed simultaneously. Terms indicating sequence, such as "first," "second," "next," "then," and so forth, are merely conventions used to facilitate description and do not limit the order in which steps may be performed.

FIG. 5 shows a hand-held controller 500, which may be used in connection with the equatorial mount 100 and for performing the balance test process 400. The controller 500 includes a display 510 and buttons 512. The controller 500 is an example of the controller 220 of FIG. 2, and the display 510 is an example of the display 218 of FIG. 2. The controller 500 may be connected to the communications interface 130 of the mount using one or more cables. In one example, the controller is a GoToNova® controller, available from iOptron Corporation in Woburn, Mass. This is not required, however. Other types of controllers may be used.

The controller 500 may be programmed to output to its display 510 an indication of the balance test result, such as the R.A. balance test result or DEC balance test result.

Having described certain embodiments, numerous alternative embodiments or variations can be made. For example, although the balance results are displayed with the hand-held controller 500, this is merely an example. Alternatively, the controller may be another type of computing device, such as a laptop computer, desktop computer, PDA, smart phone, tablet computer, or the like. In one example, the controller may be a smart phone running an application (app) for controlling a telescope mount. The mount may be controlled via a Bluetooth, WiFi or other wireless connection between the smart phone or computer and the communications interface 130. The method 400 may be conducted using software and/or firmware on the smart phone, for example.

Although the improved balancing technique has been described in connection with a German equatorial mount, it may also be used with other motor driven telescope mounts or equipment. These include, but are not limited to, altazimuth mounts, fork mounts, or spherical mounts, for example. Also, although it is shown that balancing is performed on two axes of a telescope, balancing may alternatively be performed on only a single axis.

Also, the balancing techniques described herein may be implemented in motor driven kits for converting manual mounts to a motor driven mounts. An example of this type of kit is the GoToNova® GOTO Kit, available from iOptron Corporation in Woburn, Mass.

Also, although the balance results are shown with a shaded arrow, this is merely an example. Alternatively, the balance results can be displayed using words, numbers, charts, graphs, other types of visual depictions, or any combination of these. They may also be presented with sounds or computer-generated speech, for example. Also, it is understood that the criteria of a well balanced current difference can be set at any suitable current difference value, which will depend on the design of the mount and weight of the optical assembly and accessories.

Also, although an example is described for use with DC servo motors, the techniques herein will work equally well with other types of motors. In measuring motor current, the techniques herein obtain a measure of the work performed by the motor in moving the telescope in two directions. In some examples, e.g., with certain types of motors or motor drivers, it may also be desired to measure voltage applied to a motor as well as current. These types of arrangements are intended to be included herein.

Also, while a particular current measuring scheme is shown, those skilled in the art will realize that there are many ways of measuring motor current, including analog integration and inductive coupling, for example.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to any particular embodiment or embodiments disclosed.

Various aspects of the present invention may be used alone, in combination, or in a variety of arrangements not specifically set forth in the foregoing. For example, aspects described in one embodiment may be combined in any manner with aspects described in other embodiments. Also, the various methods or processes outlined herein may be encoded as software. The software may be written using any of a number of suitable programming languages and/or programming or scripting tools.

Also, the invention or portions thereof, such as the process 400, may be embodied as a computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various embodiments of the invention described above. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of balancing a telescope, comprising:
    directing a motor to drive the telescope in a first rotational direction about an axis of the telescope;
    measuring a first current drawn by the motor;
    directing the motor to drive the telescope in a second rotational direction opposite the first rotational direction;
    measuring a second current drawn by the motor; and
    producing an indication of balance of the telescope based on a difference between the first current and the second current.

2. The method of claim 1, further comprising, prior to directing the motor to drive the telescope in the first rotational direction, directing the motor to drive the telescope to a rotational position about the axis of the telescope that substantially maximizes the difference between the first current and the second current.

3. The method of claim 1, wherein measuring the first current is performed while the motor is driving the telescope in the first rotational direction at a substantially constant rotational speed.

4. The method of claim 3, wherein directing a motor to drive the telescope in the second rotational direction includes directing the motor to rotate a predetermined amount to allow the motor to overcome backlash, and wherein measuring the second current is performed while the motor is driving the telescope in the second rotational direction at a substantially constant rotational speed.

5. The method of claim 4, wherein measuring each of the first current and the second current includes:
    generating an electronic signal proportional to the respective current;
    filtering the electronic signal; and
    acquiring multiple samples of the filtered electronic signal, wherein each sample is represented in digital form.

6. The method of claim 5, wherein measuring each of the first current and the second current further includes digitally filtering the multiple samples.

7. The method of claim 1, wherein producing the indication of balance of the telescope indicates a direction of the difference between the first current and the second current.

8. The method of claim 7, wherein producing the indication of balance of the telescope further indicates a magnitude of the difference between the first current and the second current.

9. The method of claim 8, wherein the telescope has a moveable part for adjusting a balance of the telescope, and wherein, when indicating the direction of the difference between the first current and the second current, producing the indication of balance of the telescope includes indicating a direction in which the moveable part of the telescope should be moved relative to the telescope to reduce the difference between the first current and the second current.

10. The method of claim 9, wherein, when indicating the magnitude of the difference between the first current and the second current, producing the indication of balance of the telescope further includes indicating an amount to which the moveable part of the telescope should be moved relative to the telescope to substantially zero the difference between the first current and the second current.

11. The method of claim 10, wherein producing the indication of balance of the telescope further includes:
    rendering a visual representation showing a simplified image of the telescope, including the moveable part,
    wherein indicating the direction in which the moveable part of the telescope should be moved relative to the telescope is performed by displaying an arrow in the visual representation pointing in the direction, relative to the simplified image of the telescope, that the moveable part should be moved, the arrow including an arrowhead portion and an elongated portion, and wherein indicating the amount by which the moveable part of the telescope should be moved is performed by varying a feature of the elongated portion of the arrow to varying degrees in proportion to the amount of the difference between the first current and the second current.

12. The method of claim 11, wherein the moveable part is one of (i) a counterweight of the telescope moveable along a particular axis of the telescope and (ii) an optical tube assembly of the telescope moveable in a direction orthogonal to the particular axis of the telescope.

13. An apparatus for balancing a telescope, comprising:
a motor arranged to rotate an optical assembly of the telescope about an axis of the telescope;
a control circuit, coupled to the motor, the control circuit including:
a motor driver arranged to direct the motor to drive the optical assembly in a first rotational direction about the axis of the telescope and to drive the optical assembly in a second direction, opposite the first rotational direction, about the axis of the telescope;
a current measuring circuit, coupled to the motor driver and arranged to measure a first current drawn by the motor when the motor is driving the optical assembly in the first rotational direction and to measure a second current drawn by the motor when the motor is driving the optical assembly in the second rotational direction; and
a calculating circuit arranged to calculate a difference between the first current and the second current.

14. The apparatus of claim 13, wherein the motor driver includes an H-bridge arrangement of transistors coupled to the motor, and wherein the current measuring circuit includes a resistor coupled to the H-bridge and configured to produce a voltage drop proportional to a current provided to the motor.

15. The apparatus of claim 14, wherein the H-bridge includes a pair of transistors each having a first terminal coupled to the motor and a second terminal coupled to the resistor, wherein the current measuring circuit further includes an analog-to-digital converter coupled to the resistor.

16. The apparatus of claim 15, wherein the current measuring circuit further includes a low pass filter coupled in series between the resistor and the analog-to-digital converter.

17. The apparatus of claim 15, wherein the current measuring circuit further includes a digital filter coupled to the analog-to-digital converter for digitally filtering samples acquired by the analog-to-digital converter.

18. A method of balancing a telescope, comprising:
directing a first motor to drive the telescope in a first rotational direction about a first axis of the telescope;
measuring a first current drawn by the first motor;
directing the first motor to drive the telescope in a second rotational direction opposite the first rotational direction about the first axis of the telescope;
measuring a second current drawn by the first motor;
producing a first indication of balance of the telescope based on a difference between the first current drawn by the first motor and the second current drawn by the first motor;
directing a second motor to drive the telescope in a first rotational direction about a second axis of the telescope, wherein the second axis is orthogonal to the first axis;
measuring a first current drawn by the second motor;
directing the second motor to drive the telescope in a second rotational direction about the second axis of the telescope;
measuring a second current drawn by the second motor; and
producing a second indication of balance of the telescope based on a difference between the first current drawn by the second motor and the second current drawn by the second motor.

19. The method of claim 18, wherein the first axis of the telescope is one of a declination axis and a right ascension axis and the second axis is the other of the declination axis and right ascension axis.

20. The method of claim 18, further comprising:
prior to directing the first motor to drive the telescope in the first rotational direction about the first axis of the telescope, directing the first motor to drive the telescope to a rotational position about the first axis of the telescope that substantially maximizes the difference between the first current drawn from the first motor and the second current drawn from the first motor; and
prior to directing the second motor to drive the telescope in the first rotational direction about the second axis of the telescope, directing the second motor to drive the telescope to a rotational position about the second axis of the telescope that substantially maximizes the difference between the first current drawn from the second motor and the second current drawn from the second motor.

* * * * *